July 10, 1956

C. W. OWENS, SR 2,754,127

COLLAPSIBLE TRUCK WITH COLLAPSIBLE HANDLE

Filed July 7, 1954

Charles W. Owens, Sr.
INVENTOR.

BY *Clarence A. O'Brien*
*and Harvey B. Jacobson*
Attorneys

July 10, 1956  C. W. OWENS, SR  2,754,127
COLLAPSIBLE TRUCK WITH COLLAPSIBLE HANDLE
Filed July 7, 1954  2 Sheets-Sheet 2
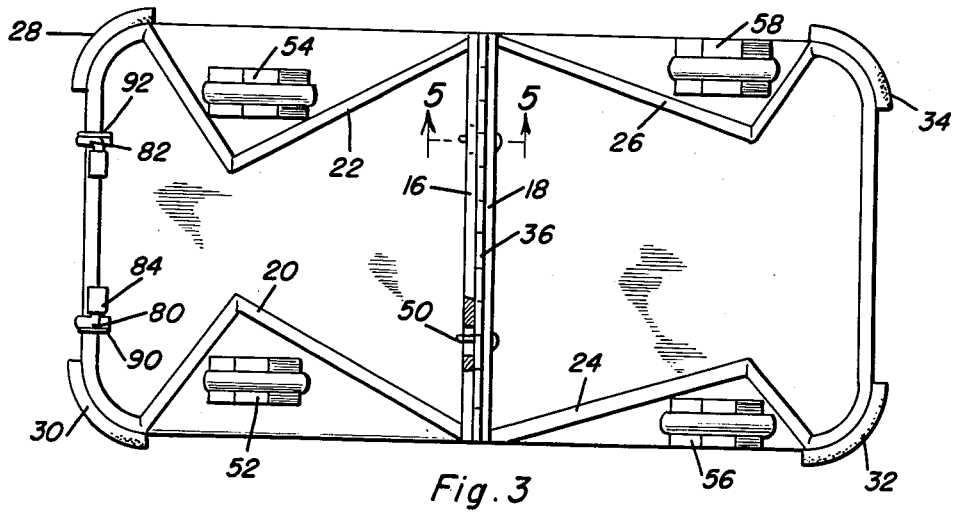
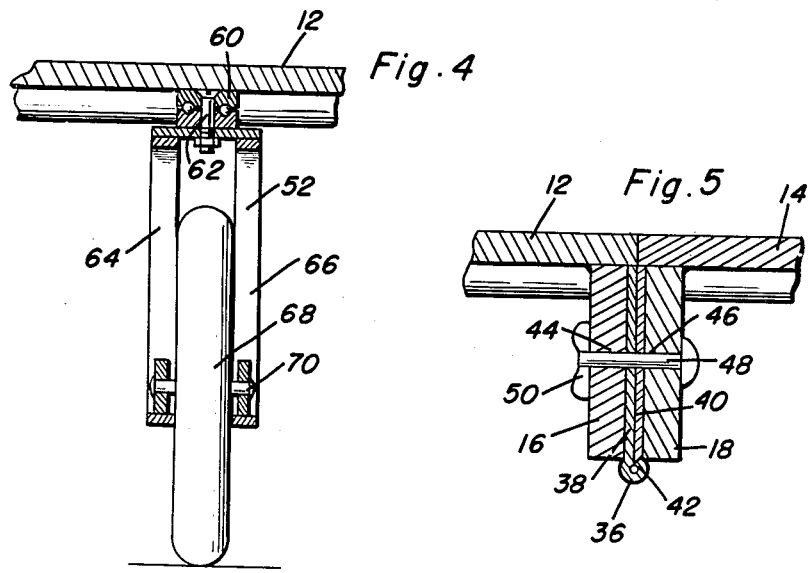
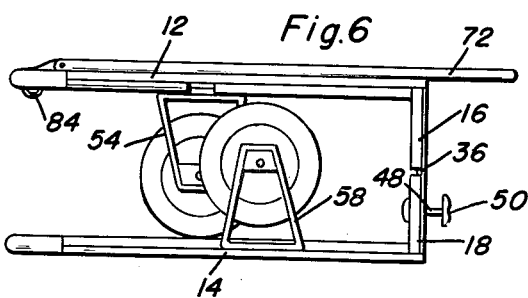
Charles W. Owens, Sr.
INVENTOR.

United States Patent Office 2,754,127
Patented July 10, 1956

2,754,127

COLLAPSIBLE TRUCK WITH COLLAPSIBLE HANDLE

Charles W. Owens, Sr., Albany, N. Y.

Application July 7, 1954, Serial No. 441,738

3 Claims. (Cl. 280—41)

This invention relates to a novel hand truck adapted to be used for various utilitarian purposes and more particularly to a truck which can be collapsed into a very small compass for storage thereof.

The primary object of the present invention resides in the provision of a hand truck having wheels and a handle suitably secured thereto and being formed in sections so that the hand truck can be collapsed so as to occupy a comparatively small space for storage or the transportation of the truck itself.

A further object of the invention resides in the provision of a hand truck having a novel handle structure which may be folded so as to lie flat with the truck when not in use and which includes means for enabling the handle to be used for both pulling or pushing the truck.

The construction of this invention features a truck formed of a pair of body sections which are hingedly secured to each other by means of flanges depending downwardly from the body section. A handle is pivotally mounted in notches in one of the sections and includes braces which are pivotally secured thereto and adapted to be engaged in recesses in the top surface of the truck.

Still further objects and features of this invention reside in the provision of a hand truck that is strong and durable, simple in construction and manufacture, constructed from a light weight material such as aluminum so as to be easily transported while having very little dead weight; and being inexpensive to construct, thereby permitting wide distribution and utilization.

These, together with the various ancillary objects and features which will become apparent as the following description proceeds, are attained by this hand truck, one embodiment of which has been illustrated in the accompanying drawings, by way of example only, wherein:

Figure 3 is a bottom plan view of the hand truck;

Figure 4 is an enlarged sectional detail view as taken along the plane of line 4—4 in Figure 2, illustrating the construction of the wheel mount;

Figure 5 is a sectional detail view in an enlarged scale as taken along the plane of line 5—5 of Figure 3, illustrating the hinge construction and means for locking the body sections in extended position; and Figure 6 is a side elevational view of the hand truck shown in a collapsed position.

Figure 1:
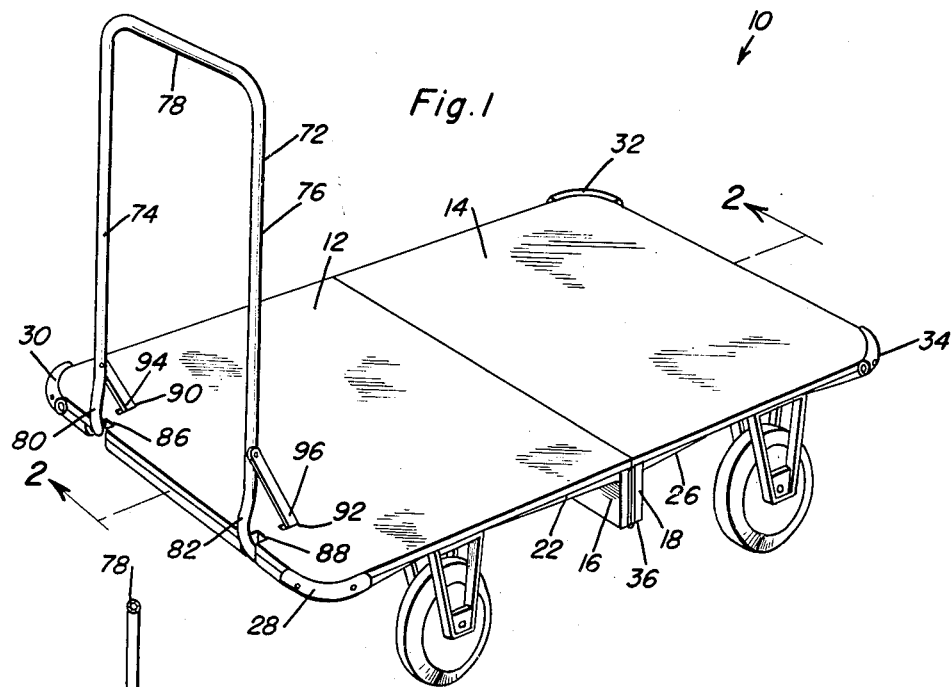
Figure 1 is a perspective view of the hand truck comprising the present invention.
Figure 2:
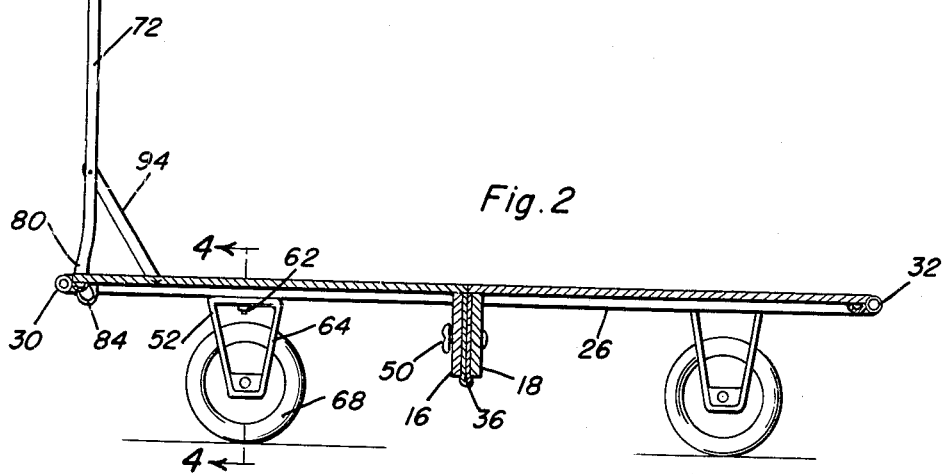
Figure 2 is a vertical sectional view as taken along the plane of line 2—2 in Figure 1, illustrating particularly the construction of the handle.

With continuing reference to the accompanying drawings, wherein like reference numerals designate similar parts throughout the various views, the reference numeral 10 generally designates the hand truck comprising the present invention. This hand truck is formed from a pair of body sections 12 and 14 which have outwardly depending flanges 16 and 18 secured thereto at the abutting edges thereof.

The body sections 12 and 14 are preferably constructed from a suitable material such as aluminum and have integrally molded therewith ribs as at 20, 22, and 24, 26 as can be best seen in Figure 3. The corners of the body sections 12 and 14 are rounded and bumpers formed of suitable tubular resilient material such as rubber or plastic are affixed thereto as at 28, 30, 32 and 34.

Secured to the downwardly depending flanges 16 and 18 is a hinge 36 having hinge leaves 38 and 40 interconnected at the knuckles thereof by means of a pintle 42. Apertures 44 and 46 are formed in the flanges 16 and 18 and are in alignment with other apertures in the hinge leaves 38 and 40 so that fasteners 48 can extend through the flanges so as to hold the body sections 12 and 14 in the extended position, as is shown in Figure 1. A wing nut or other suitable member, as indicated at 50, may be used to retain the fasteners 48 in position.

Depending from the body sections 12 and 14 are pairs of wheel mounts 52, 54 and 56, 58, each of which is of generally the same construction, which can be seen best in Figure 4. The wheel mounts 52 and 54 are arranged inwardly of and to the rear of the relative position of the wheel mounts 56 and 58 with respect to the body sections 12 and 14, respectively. The construction of each of the wheel mounts includes a bearing assembly 60 which may be welded or otherwise attached to the body section and which carries a fastener 62 to which spaced trapezoidal shaped mounting members 64 and 66 are attached. Wheels, as at 68, are mounted on axles 70 journaled in the wheel mount sections 64 and 66.

A substantially U-shaped handle 72 is provided having leg portions 74 and 76 interconnected by a cross portion 78. The lower ends of the leg portions 74 and 76 are arcuately curved as at 80 and 82 and are pivotally mounted in brackets, as at 84, or otherwise pivotally mounted. The arcuate portions 80 and 82 are for the purpose of permitting the handle 72 to lie flat and the ends 80 and 82 are pivotally mounted within slots 86 and 88 in the body section 12 further to permit the handle 72 to lie flat when the truck is collapsed, as is shown in Figure 6.

A pair of recesses 90 and 92 are formed in the upper surface of the body section 12 and are adapted to receive the ends of braces 94 and 96, the braces being pivotally attached to the handle 72. Thus, when it is desired to push the truck 10, it is merely necessary to place the braces 94 and 96 within the recesses 90 and 92 so that the braces can rigidify the handle. However, the handle 72 can be readily used to pull the truck and can pivot forwardly whereby the handle 72 becomes effective as a drawbar.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A hand truck comprising a pair of body sections, wheel mounts rotatably attached to said body sections with the wheel mounts being attached to one body section inwardly and rearwardly positioned with respect to the position of the wheel mounts attached to the other of said body sections, downwardly depending flanges secured to said body sections, said flanges being hingedly secured together, and fasteners extending through said flanges to lock said truck in an extended position, slots opening into the peripheral edge of said one of said body sections, a U-shaped handle having arcuate end portions pivotally attached to said one of said body sections in said slots, recesses in said one of said body sections, and braces pivotally attached to said handle adapted to be removably positioned in said recesses.

2. A hand truck comprising a pair of body sections, wheel mounts rotatably attached to said body sections with the wheel mounts being attached to one body section inwardly and rearwardly positioned with respect to the position of the wheel mounts attached to the other of said body sections, downwardly depending flanges secured to said body sections, said flanges being hingedly secured together, and fasteners extending through said flanges to lock said truck in an extended position, slots opening into the peripheral edge of said one of said body sections, a U-shaped handle having arcuate end portions pivotally attached to said one of said body sections in said slots, recesses in said one of said body sections, and braces pivotally attached to said handle adapted to be removably positioned in said recesses, said body sections having a rib structure integrally formed therewith.

3. A hand truck comprising a pair of body sections, wheel mounts rotatably attached to said body sections with the wheel mounts being attached to one body section inwardly and rearwardly positioned with respect to the position of the wheel mounts attached to the other of said body sections, downwardly depending flanges secured to said body sections, said flanges being hingedly secured together, and fasteners extending through said flanges to lock said truck in an extended position, slots opening into the peripheral edge of said one of said body sections, a U-shaped handle having arcuate end portions pivotally attached to said one of said body sections in said slots, recesses in said one of said body sections, and braces pivotally attached to said handle adapted to be removably positioned in said recesses, said body sections having a rib structure integrally formed therewith, said truck having rounded corners and having resilient tubular bumpers secured to said corners.

References Cited in the file of this patent
UNITED STATES PATENTS

| | | |
|---|---|---|
| 781,243 | Thompson | Jan. 31, 1905 |
| 1,053,422 | McGill | Feb. 18, 1913 |
| 1,120,541 | Robinson | Dec. 8, 1914 |
| 1,226,585 | Parker et al. | May 15, 1917 |
| 1,643,268 | Burnwatt | Sept. 20, 1927 |
| 2,683,480 | Kosman | July 13, 1954 |